(12) United States Patent
Das et al.

(10) Patent No.: US 8,473,930 B2
(45) Date of Patent: Jun. 25, 2013

(54) HANDLING SIGNALS AND EXCEPTIONS IN A DYNAMIC TRANSLATION ENVIRONMENT

(75) Inventors: Abhinav Das, Sunnyvale, CA (US); Jiwei Lu, Pleasanton, CA (US); William Y. Chen, Los Altos, CA (US); Chandramouli Banerjee, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1064 days.

(21) Appl. No.: 12/264,943

(22) Filed: Nov. 5, 2008

(65) Prior Publication Data

US 2010/0115497 A1    May 6, 2010

(51) Int. Cl.
*G06F 9/45* (2006.01)

(52) U.S. Cl.
USPC ........... 717/138; 717/151; 717/140; 714/38.1

(58) Field of Classification Search
USPC ............... 717/101–178; 712/244; 709/230
See application file for complete search history.

(56) References Cited

U.S. PATENT DOCUMENTS

| | | | | |
|---|---|---|---|---|
| 5,778,211 A | * | 7/1998 | Hohensee et al. | 703/26 |
| 5,907,708 A | * | 5/1999 | Hohensee et al. | 712/244 |
| 5,930,509 A | * | 7/1999 | Yates et al. | 717/159 |
| 6,091,897 A | * | 7/2000 | Yates et al. | 717/138 |
| 6,173,248 B1 | * | 1/2001 | Brauch | 703/26 |
| 6,247,172 B1 | * | 6/2001 | Dunn et al. | 717/141 |
| 6,993,754 B2 | * | 1/2006 | Freudenberger et al. | 717/153 |
| 7,058,932 B1 | * | 6/2006 | Jennings et al. | 717/138 |
| 7,065,750 B2 | * | 6/2006 | Babaian et al. | 717/136 |
| 7,194,733 B2 | * | 3/2007 | Ringseth et al. | 717/136 |
| 7,254,806 B1 | * | 8/2007 | Yates et al. | 717/136 |
| 7,313,790 B2 | * | 12/2007 | Ju | 717/159 |
| 7,757,221 B2 | * | 7/2010 | Zheng et al. | 717/136 |
| 7,930,707 B2 | * | 4/2011 | Bronnikov | 719/331 |
| 2005/0071824 A1 | * | 3/2005 | K. N. et al. | 717/138 |
| 2005/0086650 A1 | * | 4/2005 | Yates et al. | 717/139 |
| 2007/0079304 A1 | * | 4/2007 | Zheng et al. | 717/151 |

* cited by examiner

*Primary Examiner* — Lewis A Bullock, Jr.
*Assistant Examiner* — Francisco Aponte
(74) *Attorney, Agent, or Firm* — Brooks Kushman P.C.

(57) ABSTRACT

A method for executing non-native binaries on a host computer architecture comprises receiving the guest executable binary into a computer readable medium. The guest executable binary is executed on the host computer architecture by translating the guest executable binary into a translated executable binary. Each instruction of the translated executed binary is then executed on the host computer architecture. Signals are responded to by placing signal information on a signal queue and deferring signal handling until a safe point is reached. A computer system implementing the method is also provided.

9 Claims, 5 Drawing Sheets

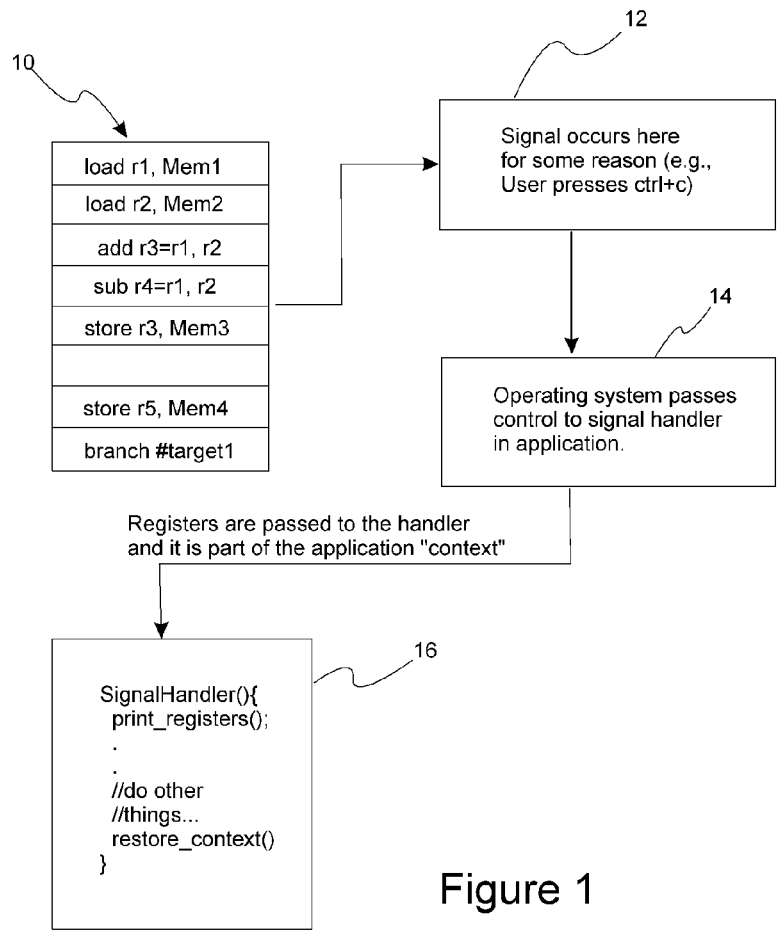
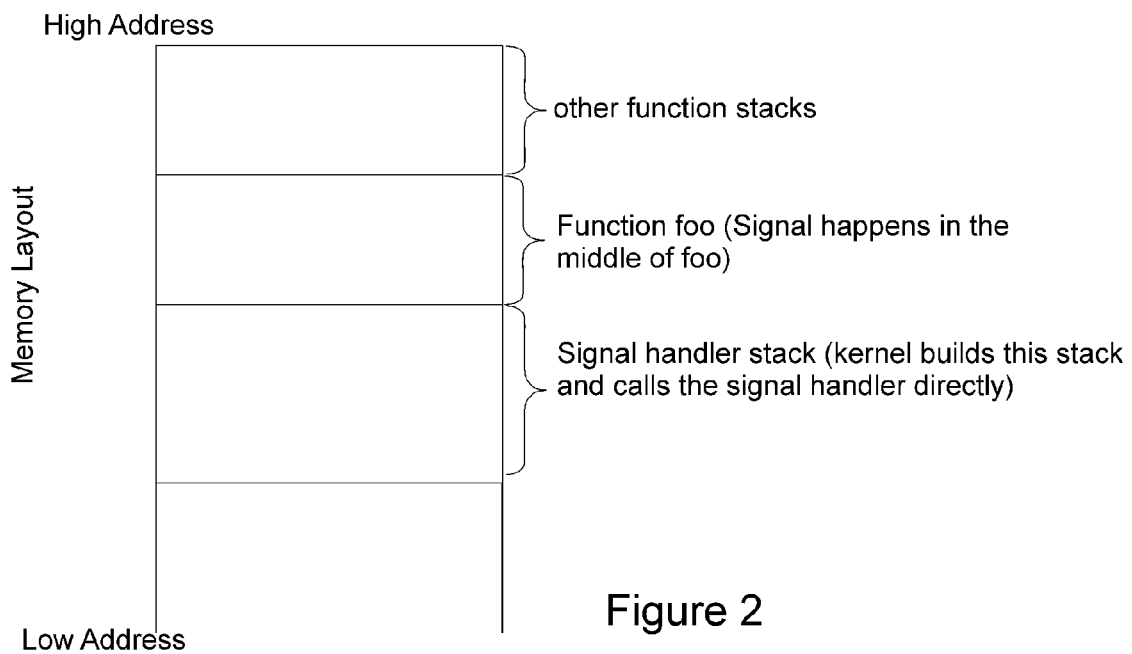

HANDLING SIGNALS AND EXCEPTIONS IN A DYNAMIC TRANSLATION ENVIRONMENT

BACKGROUND OF THE INVENTION

1. Field of the Invention

The present invention relates to a methods of running non-native binaries on a host computer system.

2. Background Art

Currently, a large number of differing computer architectures are utilized both commercially and privately. Although many software applications exist for each of these platforms, there are frequent instances in which a desired program will not run a given architecture. This is particularly true for custom applications developed to a specialized task. Binary translation, and in particular dynamic binary translation, is utilized to provide capability of running non-native code on a host computer system.

In general, signals are events or messages that are passed between processes executing on a computer system. Signals are generated by the operating system to redirect execution in response to asynchronous activity, such as exceptions generated during program execution or user input (e.g., mouse click, ctrl+c, and the like). The occurrence of a signal causes the operating system to interrupt the normal execution of a process. Signal handlers are then deployed to deal with the signal.

FIG. 1 provides a schematic illustration of a method for running a native binary on a computer architecture that receives a signal from the operating system. Application stack 10 includes a set of instructions that are executed by the host architecture's computer architecture. A signal occurrence is illustrated by box 12. The operating system subsequently passes control to a signal handler as shown by box 14. Specifically, upon receiving a user-signal or an exception, the operating system looks up in its data structures to see if signal-handler function 16 is registered with the operating system by the application. If such a signal handler exists, the operating system builds the arguments and other data necessary to run signal handler function 16, on the application stack and starts execution at the signal handler. The arguments passed to the signal handler usually include signal information and information about the execution context. Hardware register state is part of this execution context.

FIG. 2 provides an example memory layout of the stack for each function (known as activation stacks) and the signal handler. Each computer architecture pre-defines such memory layouts and the contents of the activation stack. Generally, differing computer architectures have differing memory maps.

FIG. 3 provides a schematic illustration of two fundamental issues related to signal handling that must be addressed during dynamic binary translation. The instructions on guest application stack 20 are translated into instructions on host application stack 22. It should be appreciated that a single guest instruction may require several host instructions to be properly implemented. In this scenario, a signal occurrence is illustrated by box 24. The operating system subsequently passes control to a signal handler as shown by box 26. The first issue indicated by item number 28 relates to the setup and execution of the signal handler function as the signal handler is invoked directly by the operating system. Since the invocation is done directly by the operating system, which in our case is native to the platform, it does not understand the conventions for the guest architecture. The native operating system will pass information that can be understood by native signal handlers, but not by guest signal handlers.

The second issue indicated by item number 30 relates to getting the correct execution state (as hardware registers are emulated). The difficulty associated with establishing the correct execution state occurs due to the fact that many host instructions are needed for one guest instruction. For a native application, signals are delivered by the kernel on native instruction boundaries. For translated guest applications, signals can be delivered in the middle of guest instruction emulation. In such a situation, a guest instruction executed halfway can cause incorrect execution if execution is redirected by the signal handler to an alternate location that is dependent on the execution state being up-to-date.

Accordingly, there is a need for improved methods of executing non-native code on a host computer system.

SUMMARY

The present invention solves one or more problems of the prior art by providing in at least one embodiment a method for executing non-native binaries on a host computer architecture. The method of this embodiment comprises receiving the guest executable binary into memory. The guest executable binary is executed on the host computer architecture by translating the guest executable binary into a translated executable binary. Each instruction of the translated executed binary is then executed on the host computer architecture. Signals are responded to by placing signal information on a signal queue and deferring signal handling until a safe point is reached. Upon reaching a safe point, each signal on the signal queue is handled by an associated signal handler. At the safe point, signals can be handled correctly and guest execution context can be built correctly. At the start of another block of code, execution context is correct and signals are handled at this point by inspecting the queue. A host signal handler is registered for each guest signal handler that defers the signal. The stub at the start of each block of code inspects the queue and builds the activation stack in a way that the guest signal handler understands.

In another exemplary embodiment, a method for executing non-native binaries on a host computer architecture is provided. The method of this embodiment comprises receiving a guest executable binary encoded on a computer readable medium. The guest executable binary is then executed on the host computer architecture translating an instruction from the guest executable binary to a code block including instructions that are executable on the host computer architecture. Each instruction of the code block is executed. These execution steps are repeated until execution of the guest executable binary is completed. Signals are responded to by placing signal information on a signal queue and deferring handling of the signal until a safe point during the execution of the guest executable binary. In this context, a safe point occurs at a position in the translated executable binary where the execution context permits proper handling of the signal.

In another exemplary embodiment of the present invention, a computer system for implementing the method set forth above is provided. The computer system of this embodiment includes a computer processor operable to receive a guest executable binary encoded on a computer readable medium. The guest executable binary is executable on a first computer architecture. Each instruction of the translated executed binary is then executed on the host computer architecture. Signals are responded to by placing signal information on a signal queue and deferring signal handling until a safe point is reached. Upon reaching a safe point, each signal on the signal queue is handled by an associated signal handler.

BRIEF DESCRIPTION OF THE DRAWINGS

FIG. 1 is a schematic illustration of a method for running a native binary on a computer architecture;

FIG. 2 provides an example memory layout of the stack for each function and the signal handler shown in FIG. 1;

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "signal" as used herein means any event, message, or data structure that is passed between processes executing on a computer system. For example, signals include interrupts, exceptions, and the like.

Figure 3:
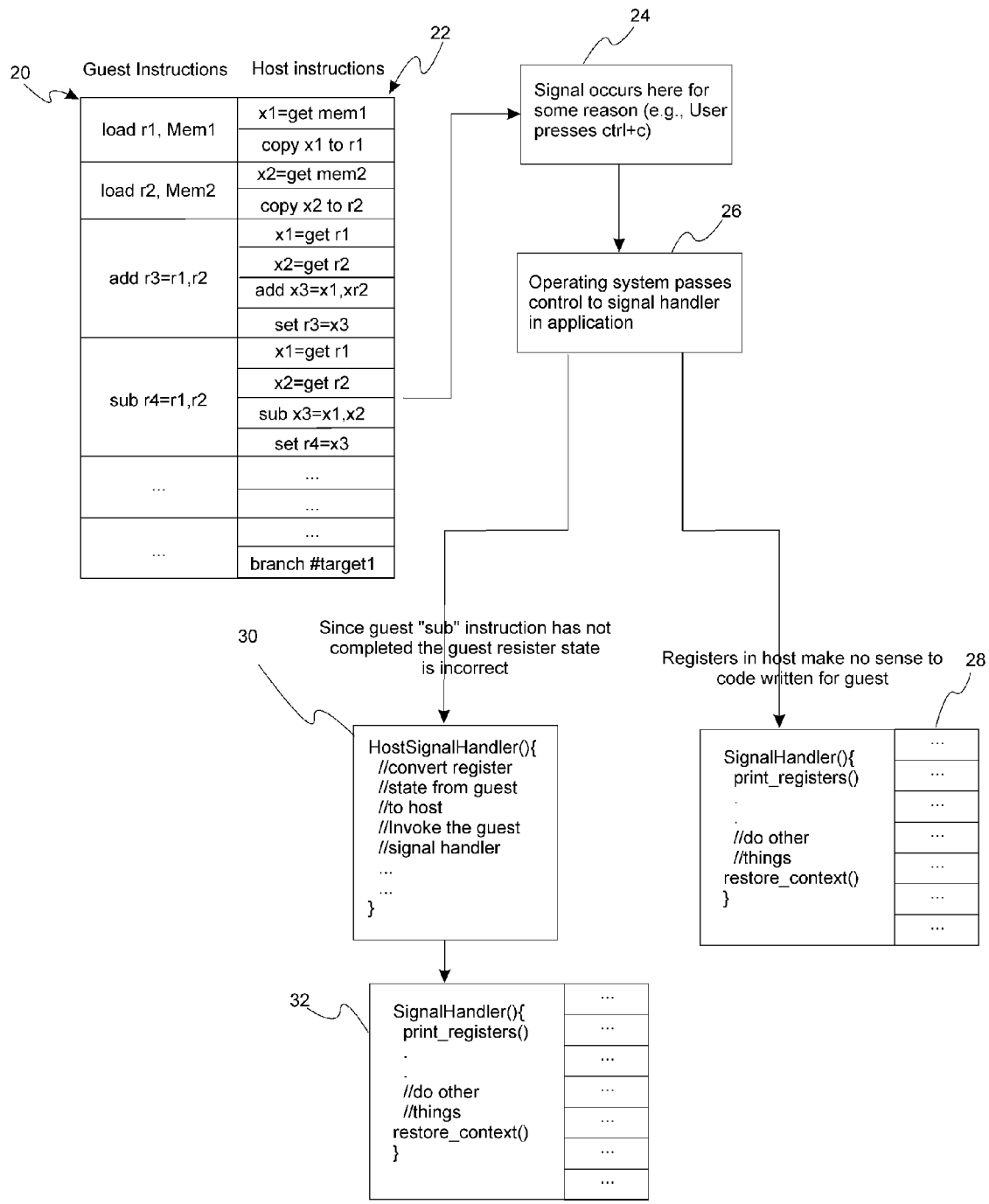
FIG. 3 is a schematic illustration showing signal handling during dynamic binary translation.
Figure 4:
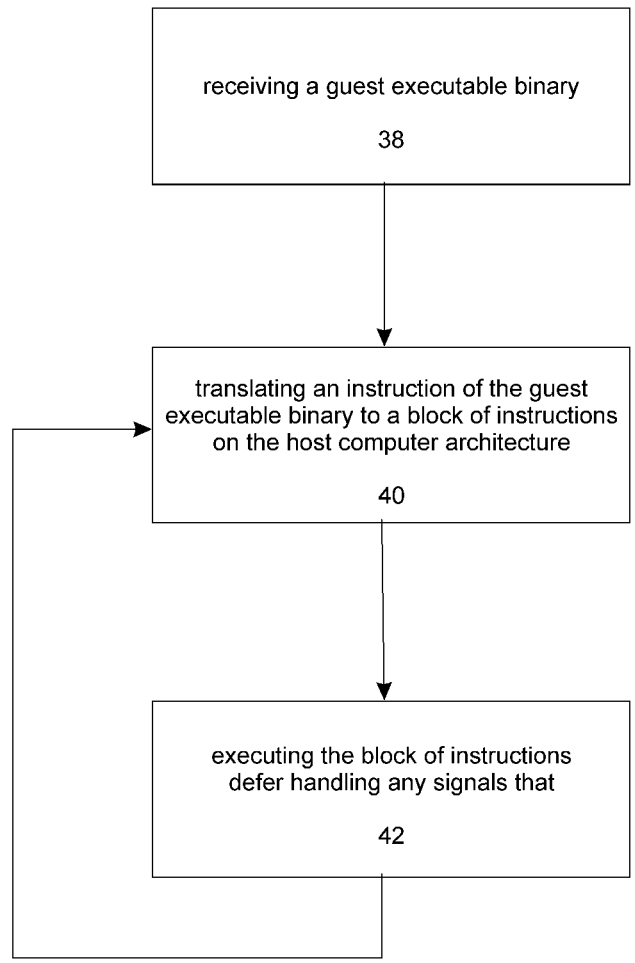
FIG. 4 is a flowchart describing an exemplary embodiment of a method for executing the guest binary.
Figure 5:
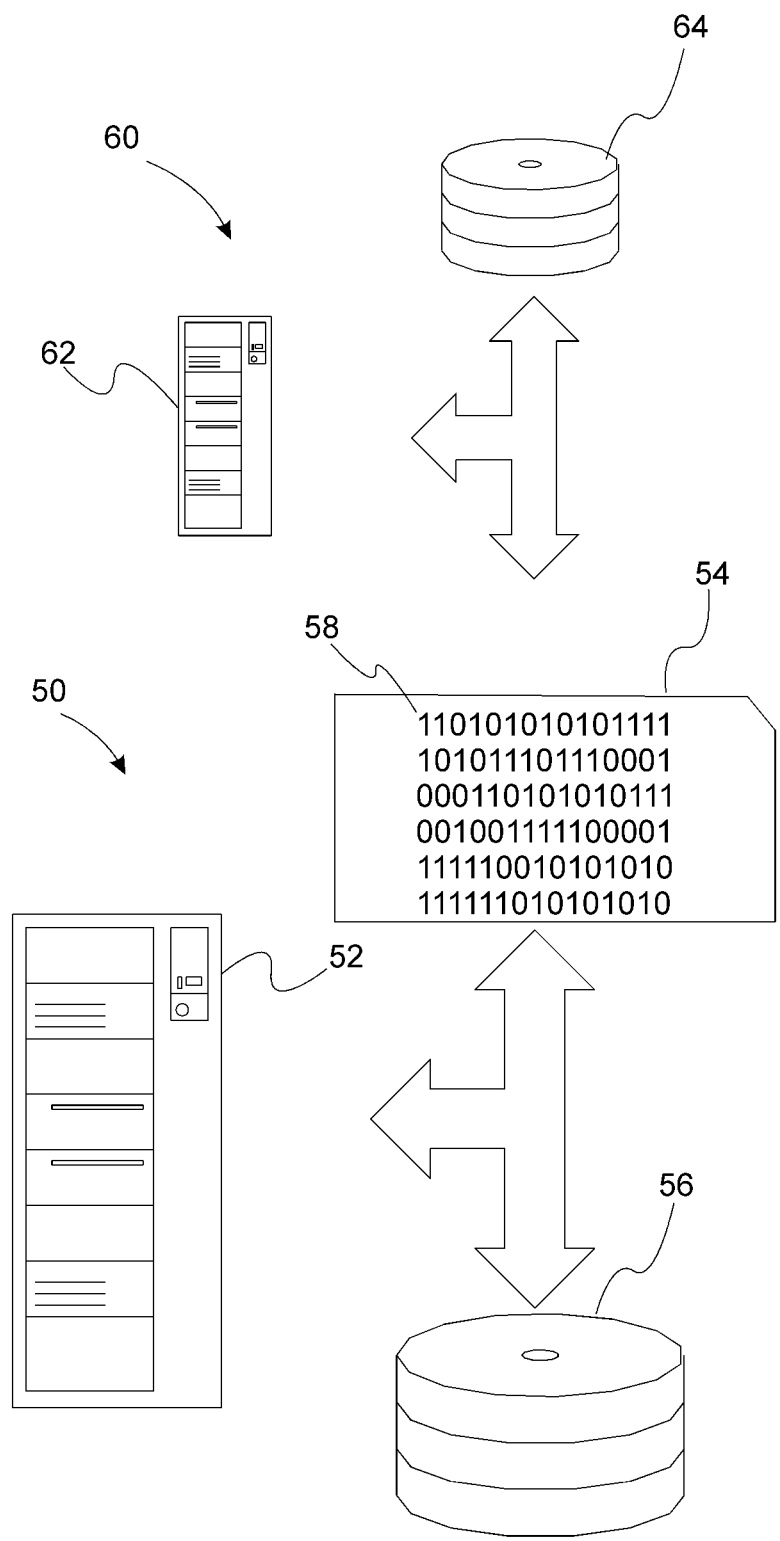
FIG. 5 is a schematic illustration of a computer architecture used to implement an exemplary embodiment of the present invention.

With reference to FIGS. 4 and 5, a host computer system that implements a method of executing a guest binary is described. FIG. 4 provides a flowchart describing an exemplary embodiment of a method for executing the guest binary. The guest executable binary, which is encoded on a computer readable medium, is received into memory (Box 38). The guest executable binary is executed on the host computer architecture by translating the guest executable binary into a translated executable binary (Box 40). Each instruction of the translated executed binary is then executed on the host computer architecture (Box 42). Signals are responded to by placing signal information on a signal queue and deferring signal handling until a safe point is reached. A safe point is a position in the activation stack of the translated executable binary where the execution context permits proper handling of the signal. Upon reaching a safe point, each signal on the signal queue is handled by an associated signal handler. In a variation, each instruction is translated into a code block of instructions for the host computer architecture. Each translated code block is executed and then another instruction from the guest binary is translated into another code block for the host computer architecture. This process is iteratively repeated until execution of the guest binary is completed.

FIG. 5 is a schematic illustration of a system implementing a method of executing a non-native executable on a host computer architecture. Host computer system 50 includes host computer processor 52 which is in communication with computer memory 54 and memory storage device 56. Computer memory 54 is typically random access memory. Examples of suitable memory storage devices include, but are not limited to, hard drives (includes RAID), tape drives, CDROMs, DVDs, and the like.

In a refinement of the present embodiment, host computer architecture 52 is a microprocessor-based computer system. Host computer system 50 is characterized by a host computer architecture which is defined by both the specific hardware components contained with host computer system 50 as well as the operating system running on host computer system 50. Examples of operating systems that are relevant to the present invention include, but are not limited to, Solaris, Linux, Windows, and the like. Examples of hardware architectures that are relevant to the present invention include, but are not limited to, RISC, CISC, and MIPS architectures. More specific hardware architectures are exemplified by the Sparc™ and Intel™ x86 platforms.

In accordance with exemplary embodiments of the present invention, host computer system 50 is configured to run executable binary 58. Executable binary 58 is non-native to the computer architecture of host computer system 50. The term "non-native" as used in the present application means an executable binary that the operating system cannot normally execute on host computer system 50. Typically, executable binary 58 is designed to run on computer system 60 which has a different computer architecture than computer system 50. Such differences include hardware differences (e.g., different central processing units, memory bus designs, number of computer processors, etc.). In some variations, the difference include the utilization of different operating systems. Computer system 60 includes computer processor 62 and computer storage device 56.

Figure 6:
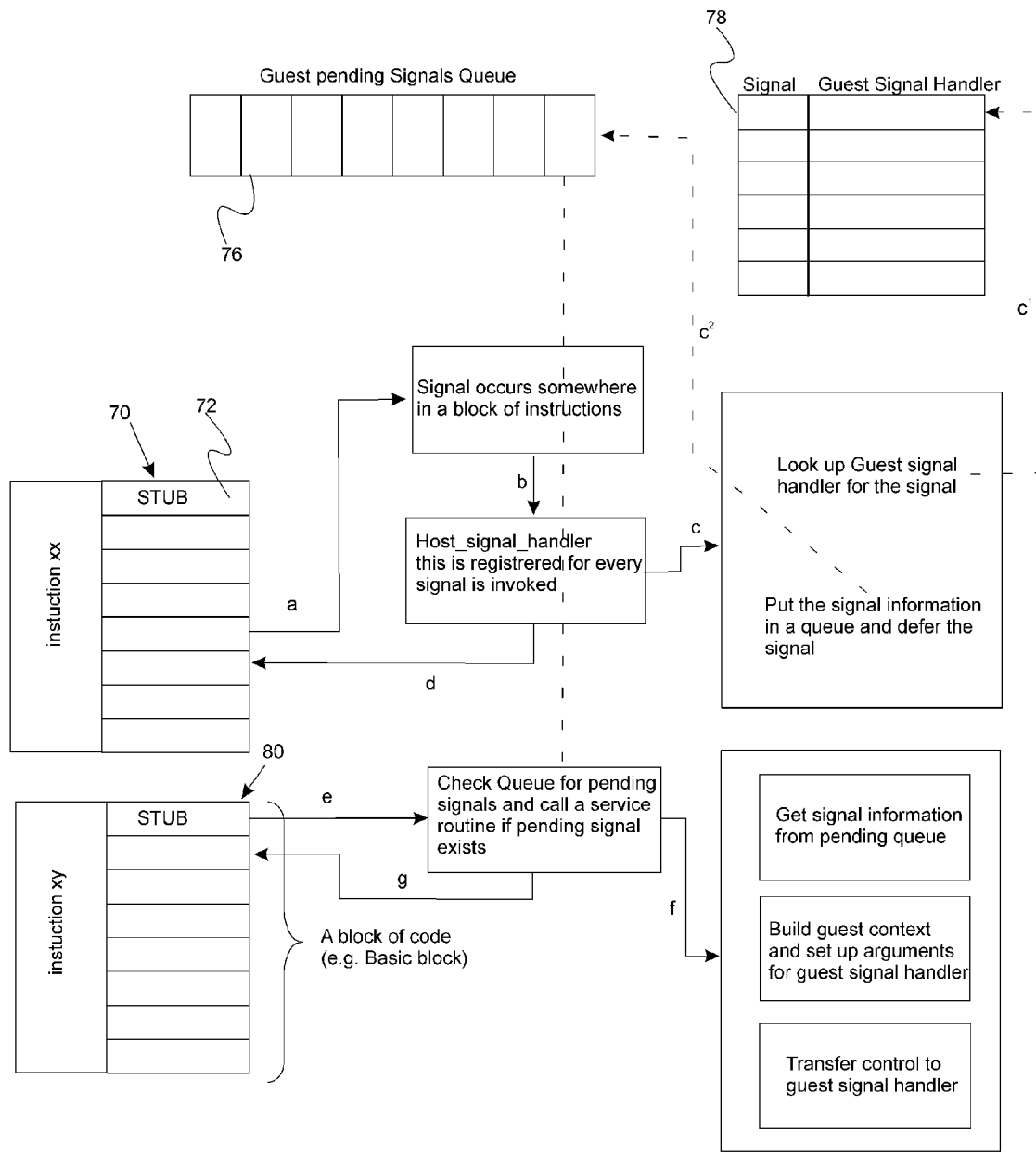
FIG. 6 is a pictorial flowchart illustrating an exemplary method of executing a guest executable binary on a host computer architecture.

With reference to FIG. 6, a flow chart schematically illustrating an exemplary method of executing non-native binaries on host computer system 50 is provided. In step a), a signal occurs somewhere in block of code 70 which includes stub 72. A stub is located at the start of each block of code that is translated. As used herein, a stub means as set of instructions that is associated with each translated block of code. Such stubs include instructions that inspect signal queue 76 and build the activation stack in a way that is processable by a guest signal handler.

Still referring to FIG. 6, a host signal handler is registered for every signal this is invoked in step b). In step c), the guest signal handler is implemented by a method that includes sub-steps $c^1$ and $c^2$. In sub-step $c^1$), the guest signal handler for the signal is looked up. In a refinement, this look up occurs in guest signal handler table 78. In sub-step $c^2$), the signal information is placed on queue 76 with the handling of the signal being deferred.

When execution of the translated code reaches safe point 80, the stub at that point that point checks signal queue 76 for pending signals. Safe point 80 is the next safe point after safe point 72. Signals on queue 76 are processed by a call to a service routine to handle the signal as shown in step e). In step f), the service routine gets information from signal queue 76, builds the proper execution context, performs the instruction translation, builds the activation stack and finally passes control to the guest signal handler. The signal handler may or may not return to the place from where it was called. If it does, execution continues from the stub as shown in step g). If it does not return, then execution just continues along the path going forward from the signal handler.

In a variation of the present embodiment, the execution of guest executable binary 58 is dynamic with the encoded instructions being sequentially translated and executed. In one refinement the dynamic translation comprises replicating or mapping the registers of the first computer architecture to the registers or memory locations in the host computer architecture. In another refinement, the dynamic translation comprises translating a predetermined small section of the guest binary. Typically, this small section is a "basic block" which starts with a first instruction at a unique entry point and ends at a last instruction at an unique exit point. In a further refinement, the last instruction of the block is a jump, call or branch instruction (conditional or unconditional).

With reference to FIG. 6 to illustrate these features, instruction xx is translated to code block 70 and then executed, instruction xy is then translated to code block 80 and then executed. The process is repeated for each instruction of the guest binary. Methods of translating instructions that can be used in the practice of the present invention are set forth in U.S. Pat. Nos. 5,560,013, 6,631,514, and 7,353,163 and U.S. Pat. Appl. Nos. 20020046305, 2003/0159134, 2004/0205733, and 2004/0210880. The entire disclosures of these patents and patent application are hereby incorporated by reference.

In another variation of the present invention, the translated instructions of translated binary 72 are cached in computer memory 54 to be used for subsequent executions. Such caching allows for instructions that are reused in the guest binary to be executed without having to re-translate these instructions. This allows the guest binary to execute more efficiently with a significant improvement in execution time.

While embodiments of the invention have been illustrated and described, it is not intended that these embodiments illustrate and describe all possible forms of the invention. Rather, the words used in the specification are words fo description rather than limitation, and it is understood that various changes may be made without departing from the spirit and scope of the invention.

What is claimed:

1. A method for executing non-native binaries on a host computer architecture, the method comprising:
   a) receiving a guest executable binary comprising a plurality of blocks of quest instructions encoded on a non-transitory computer readable medium,
   b) executing the guest executable binary on the host computer architecture by:
      1) alternating between the acts of 1) translating of a block of guest instructions from the plurality of blocks of guest instructions of the guest executable binary and 2) executing each instruction within the translated executable binary block on the host computer architecture, until the plurality of blocks are all executed; wherein
         i) during the execution of each instruction of the translated executable binary block, responding to a generation of a signal by placing signal information on a signal queue; and defer handling of the signal until a safe point of a plurality of safe points, is reached; a safe point being at a position in the activation stack of the translated executable binary; where the execution permits proper handling of any signals such that the signal is handled at the start of the translation of a subsequent guest instruction block and wherein each safe point comprises a stub having instructions for initiating the handling of the signal by inspecting the signal queue and building the activation stack in a way that is processable by a registered signal handler; and
      2) invoking stubs at every safe point to initiate the handling of any signals stored on the signal queue by a respective registered signal handler.

2. The method of claim 1, wherein the signal is processed by a call to a service routine to handle the signal.

3. The method of claim 1, wherein the service routine:
retrieves the signal information from signal queue,
builds an execution context,
performs the instruction translation,
builds the activation stack; and
passes control to the guest signal handler.

4. The method of claim 1, wherein after handling the signal, execution returns from the position on the activation stack from where a signal handler was called.

5. The method of claim 1, wherein translated instructions are cached in computer memory to be used for subsequent executions.

6. The method of claim 1, wherein step b) comprises dynamic translation.

7. A computer system for executing non-native binaries, the computer system comprising:
   a computer processor operable to:
   a) receiving a guest executable binary comprising a plurality of blocks of quest instructions encoded on a non-transitory computer readable medium,
   b) executing the guest executable binary on the host computer architecture by:
      1) alternating between the acts of 1) translating of a block of guest instructions from the plurality of blocks of guest instructions of the guest executable binary and 2) executing each instruction within the translated executable binary block on the host computer architecture, until the plurality of blocks are all executed; wherein
         i) during the execution of each instruction of the translated executable binary block, responding to a generation of a signal by placing signal information on a signal queue; and defer handling of the signal until a safe point of a plurality of safe points, is reached; a safe point being at a position in the activation stack of the translated executable binary; where the execution permits proper handling of any signals such that the signal is handled at the start of the translation of a subsequent guest instruction block and wherein each safe point comprises a stub having instructions for initiating the handling of the signal by inspecting the signal queue and building the activation stack in a way that is processable by a registered signal handler; and 2) invoking stubs at every safe point to initiate the handling of any signals stored on the signal queue by a respective registered signal handler.

8. The computer system of claim 7 wherein the computer processor is operable to process the signal by calling to a service routine to handle the signal.

9. The computer system of claim 7 wherein the service routine:
- retrieves the signal information from signal queue,
- builds an execution context,
- performs the instruction translation,
- builds the activation stack; and
- passes control to the guest signal handler.

* * * * *